United States Patent
Komori et al.

(10) Patent No.: US 10,855,122 B2
(45) Date of Patent: Dec. 1, 2020

(54) STATOR FOR ROTATING ELECTRICAL MACHINE HAVING COMPONENTS FOR REINFORCING LAMINATIONS

(71) Applicant: TOYOTA JIDOSHA KABUSHIKI KAISHA, Toyota (JP)

(72) Inventors: Kensuke Komori, Toyota (JP); Hisamitsu Toshida, Nagakute (JP); Kazuaki Haga, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/279,294

(22) Filed: Feb. 19, 2019

(65) Prior Publication Data
US 2019/0267854 A1    Aug. 29, 2019

(30) Foreign Application Priority Data
Feb. 27, 2018   (JP) .................. 2018-033832

(51) Int. Cl.
*H02K 1/14* (2006.01)
*H02K 3/52* (2006.01)
(Continued)

(52) U.S. Cl.
CPC ............... *H02K 1/146* (2013.01); *H02K 3/18* (2013.01); *H02K 3/522* (2013.01); *H02K 3/525* (2013.01); *H02K 15/10* (2013.01)

(58) Field of Classification Search
CPC .......... H02K 1/146; H02K 3/18; H02K 3/522; H02K 3/525; H02K 15/10
(Continued)

(56) References Cited

U.S. PATENT DOCUMENTS

| 2004/0061409 A1* | 4/2004 | Grant | .................... | H02K 15/024 |
| | | | | 310/216.057 |
| 2007/0200450 A1* | 8/2007 | Yukitake | ................... | H02K 1/08 |
| | | | | 310/216.091 |

(Continued)

FOREIGN PATENT DOCUMENTS

| JP | 2010-148225 A | 7/2010 |
| JP | 2010-206938 A | 9/2010 |

(Continued)

*Primary Examiner* — Tulsidas C Patel
*Assistant Examiner* — Rashad H Johnson
(74) *Attorney, Agent, or Firm* — Oliff PLC

(57) ABSTRACT

Provided is a stator for rotating electrical machine that can avoid the sagging of teeth stacked at the distal ends under the self-weight. A stator core is a laminate of metal foil members stacked in a direction of a rotation axis of the rotating electrical machine. Each tooth has a pair of side walls facing the neighboring teeth in the circumferential direction. The stator includes a pair of insulating reinforcing members so as to become a bridge between the corresponding tooth and a part of the yoke and sandwich the corresponding tooth from both sides in the direction of the rotation axis while exposing the pair of side walls; insulating fixing members, each fixing member fixing the corresponding pair of reinforcing members to the corresponding tooth while wrapping around the pair of reinforcing members and tooth; and coils formed as distributed windings at the teeth fixed with the fixing members.

10 Claims, 6 Drawing Sheets

(51) Int. Cl.
*H02K 3/18* (2006.01)
*H02K 15/10* (2006.01)

(58) Field of Classification Search
USPC ........... 310/214, 216.004, 216.015, 216.016,
310/216.017, 216.041, 216.058, 216.105
See application file for complete search history.

(56) References Cited

U.S. PATENT DOCUMENTS

| | | | |
|---|---|---|---|
| 2017/0141653 A1* | 5/2017 | Okazaki | H02K 9/19 |
| 2017/0222513 A1* | 8/2017 | Lee | H02K 3/522 |
| 2017/0229930 A1 | 8/2017 | Makino et al. | |
| 2017/0237304 A1* | 8/2017 | Okochi | H02K 3/325 |
| | | | 310/216.069 |
| 2017/0324295 A1* | 11/2017 | Tomonaga | H02K 3/522 |

FOREIGN PATENT DOCUMENTS

| | | |
|---|---|---|
| JP | 2014-079101 A | 5/2014 |
| JP | 2015-228713 A | 12/2015 |
| JP | 2017-143251 A | 8/2017 |

* cited by examiner

STATOR FOR ROTATING ELECTRICAL MACHINE HAVING COMPONENTS FOR REINFORCING LAMINATIONS

CROSS REFERENCE TO RELATED APPLICATIONS

The present application claims priority from Japanese patent application JP 2018-033832 filed on Feb. 27, 2018, the content of which is hereby incorporated by reference into this application.

BACKGROUND

Technical Field

The present disclosure relates to a stator for rotating electrical machine used for electrical generators and motors, for example, and more particularly relates to a stator for rotating electrical machine that includes a coil at a stator core having a laminate of a plurality of foil members.

Background Art

Conventional stators for rotating electrical machine of this type include a stator and a coil wound around the stator. JP 2015-228713 A proposes such a stator for rotating electrical machine, and the stator proposed includes a stator core formed by stacking core pieces (foil members) made of a soft magnetic material in the direction of the rotation axis. This stator core has teeth, and wires are wound around theses teeth as distributed windings or as concentrated windings to form a coil at the stator.

SUMMARY

Such a core for rotating electrical machine described in JP 2015-228713 A, for example, includes foil-members, and a plurality of teeth protruding to have a coil wound therearound and extending radially inwardly from the annular yoke. The distal ends of the teeth may sag under their self-weight. Such sagging may degrade the efficiency of the rotating electrical machine.

To avoid such sagging of the plurality of teeth under their self-weight, each tooth may have a tubular reinforcing member that surrounds the tooth. In that case, however, a part of the reinforcing member is placed in the slot, which decreases the space factor of the coil and so may reduce the efficiency of the rotating electrical machine. Especially distributed windings are seriously affected from a decrease of the space factor of the coil for the efficiency of a rotating electrical machine as compared with concentrated windings.

In view of the above problems, the present disclosure provides a stator for rotating electrical machine capable of suppressing the sagging of a plurality of teeth including a laminate of foil members at the distal ends under their self-weight, keeping a sufficient space factor of the coils in the form of distributed windings, and maintaining the efficiency of the rotating electrical machine.

In this context, a stator for rotating electrical machine according to the present disclosure includes a stator core including an annular yoke and a plurality of teeth that extend radially inwardly from an inner peripheral surface of the yoke and are disposed at intervals in a circumferential direction of the yoke. The stator core is a laminate of a plurality of foil members made of a soft magnetic material that are stacked in a direction of a rotation axis of the rotating electrical machine, each tooth has a pair of side walls that face neighboring teeth in the circumferential direction. The stator includes: a plurality of pairs of reinforcing members having an insulating property, each pair of the reinforcing members becoming a bridge between a corresponding tooth and a part of the yoke and sandwiching the corresponding tooth from both sides in the direction of the rotation axis while exposing the pair of side walls; a plurality of fixing members having an insulating property, each of the fixing members fixing the corresponding pair of reinforcing members to the corresponding tooth while wrapping around the pair of reinforcing members and tooth; and coils formed as distributed windings at the plurality of teeth that is fixed with the fixing members.

The stator for rotating electrical machine according to the present disclosure includes a laminate of a plurality of foil members made of a soft magnetic material as a stator core, and the teeth of the stator core extend radially inwardly from the annular yoke to have a cantilever structure while protruding from the yoke. The pair of reinforcing members having an insulating property of the present disclosure becomes a bridge between the corresponding tooth and a part of the yoke and sandwiches the corresponding tooth from both sides in the direction of the rotation axis while exposing a pair of side walls of the tooth. The fixing member having an insulating property then fixes such a pair of reinforcing members to the corresponding tooth so that the fixing member wraps around the pair of reinforcing members and tooth. This allows each tooth to be fixed with the reinforcing members more stably and so can avoid the sagging of the tooth at the distal end under the self-weight.

The pair of reinforcing members having an insulating property sandwiches the corresponding tooth from both sides in the direction of the rotation axis while exposing a pair of side walls of the tooth. This can keep enough space between the teeth (i.e., space as slot) to place windings. In this way the present disclosure can keep enough space factor of the coils in the form of distributed windings and can maintain the efficiency of the rotating electrical machine.

The fixing member may have any shape or be made any material without limitation as long as it can fix the reinforcing members to the tooth and has an insulating property. For example, the fixing member may be resin tape that wraps around the tooth and the pair of reinforcing members. In some embodiments, the fixing member has a ring-shape or a tubular-shape having an internal space, into which the corresponding tooth is inserted.

According to this aspect, the pair of reinforcing members sandwiches the corresponding tooth from both sides in the direction of the rotation axis, and such a pair of reinforcing members as well as the tooth is inserted into the internal space of the ring-shaped or tubular fixing member. This allows the fixing member to continuously wrap around each tooth and the pair of reinforcing members sandwiching the tooth for fixing. When the fixing member is made of an elastic material, such as rubber, such a fixing member elastically deforms to follow thermal expansion or thermal contraction of the tooth during the operation of the rotating electrical machine, and so can fix the pair of reinforcing members to the tooth stably. When the fixing member is made of synthetic resin that contracts by heat, such a fixing member contracts when it is heated during the operation of the rotating electrical machine, and so this can keep the fixing of the tooth with the pair of reinforcing members.

Although the teeth may have their corresponding pairs of reinforcing members individually, the reinforcing member may include an annular part having a shape along the yoke and reinforcing parts each extending from the annular part toward the corresponding tooth. The reinforcing member in this aspect has a monolithic structure including the annular part having a shape along the yoke and the reinforcing parts each extending from the annular part toward the corresponding tooth, and so can fix the teeth stably. This also facilitates to place the reinforcing parts of the reinforcing member at the respective teeth of the stator core during the manufacturing of the stator.

In some embodiments, each of the reinforcing members protrudes from the side wall of the corresponding tooth at least at a position to place the windings of the coils. In this way, the reinforcing member in such an aspect protrudes from the side wall of the corresponding tooth at least at a position to place the windings of the coils, and this allows the reinforcing member to receive a force acting on the windings of the coils during the formation of the coils or the operation of the rotating electrical machine, and so can avoid a damage of the foil members of the teeth.

In some embodiments, the fixing members each have a ring shape and are disposed at least at one of distal ends and roots of the plurality of teeth, and the winding of each coil is disposed at a part where the fixing members are not present. This configuration including the coils disposed at the parts where the fixing members are not present can prevent a decrease of the space factor of the coils wound around the teeth.

A stator for rotating electrical machine of the present disclosure can avoid sagging of a plurality of teeth, each of which is a laminate of a plurality of metal foil members, at the distal ends under the self-weight. The stator can have enough space factor of the coils in the form of distributed windings, and when a rotating electrical machine, such as a motor, includes this stator, the motor can achieve high efficiency.

DETAILED DESCRIPTION

Figure 1:
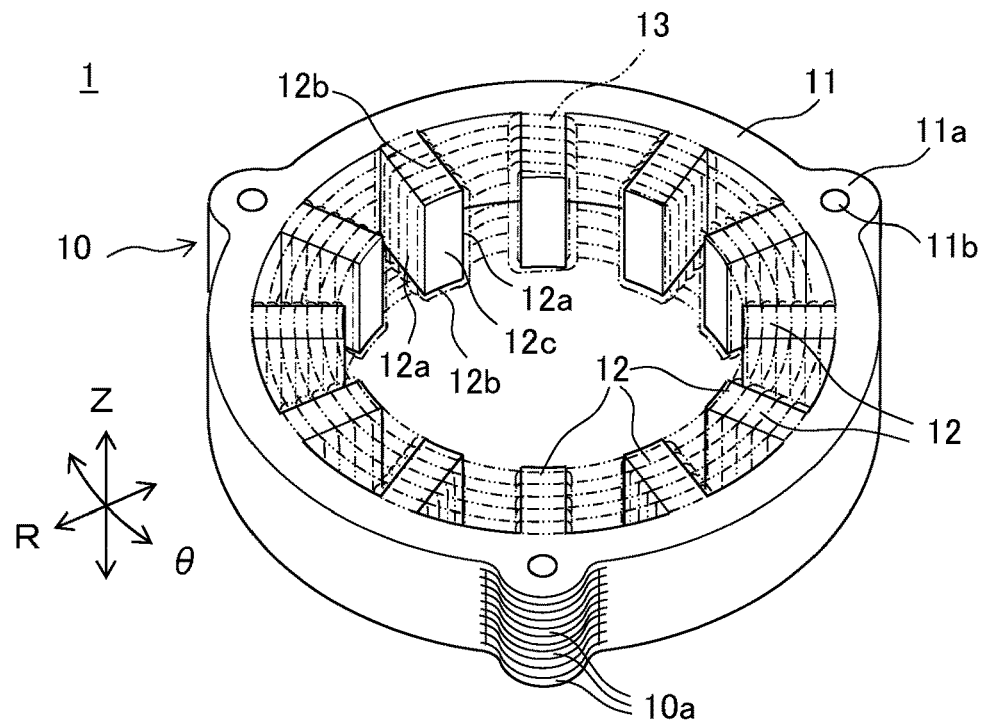
FIG. 1 is a perspective view of a stator core of a stator for rotating electrical machine according to one embodiment of the present disclosure.
Figure 2:
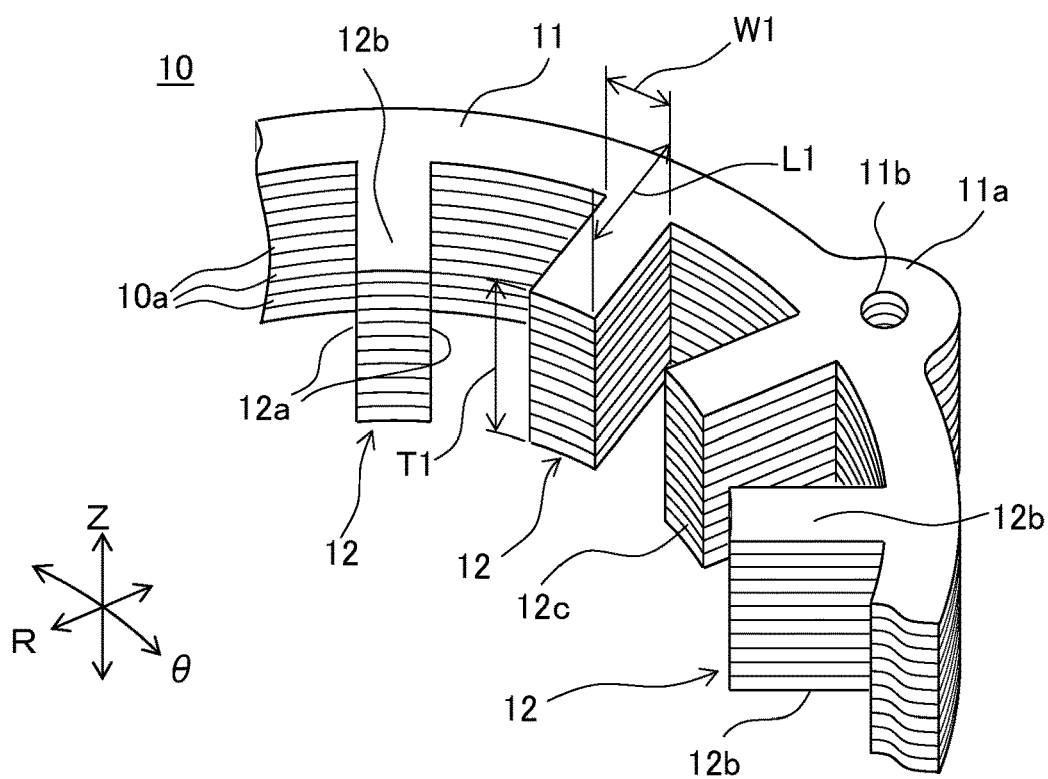
FIG. 2 is an enlarged perspective view of a major part of FIG. 1.
Figure 3:
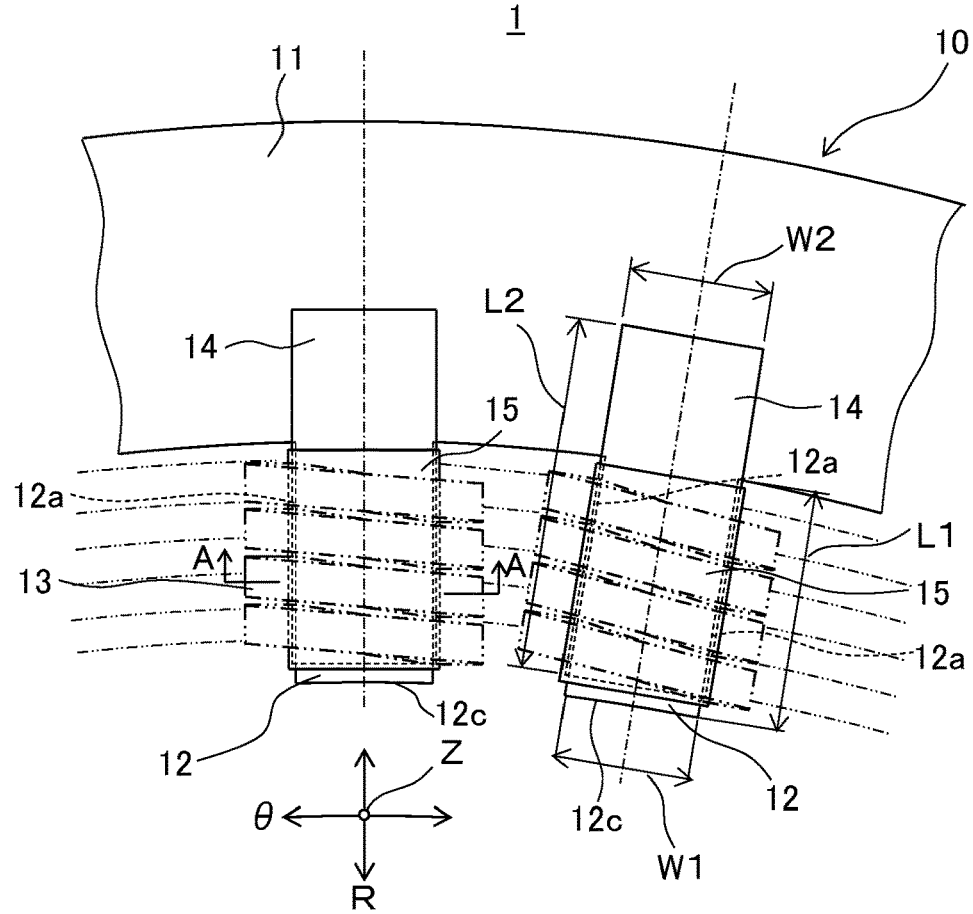
FIG. 3 is an enlarged plan view of a major part of the stator of the present embodiment.
Figure 4:
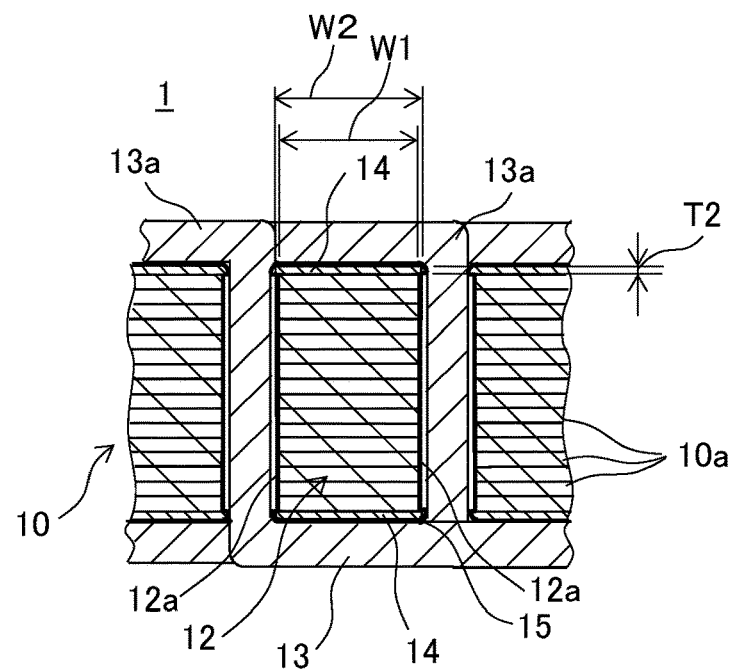
FIG. 4 is a view taken along the arrow A-A of FIG. 3.

The following describes one embodiment of a stator for rotating electrical machine according to the present disclosure in details, with reference to the drawings. FIG. 1 is a perspective view of a stator core of a stator for electrical machine according to the present embodiment. FIG. 2 is an enlarged perspective view of a major part of FIG. 1. FIG. 3 is an enlarged plan view of a major part of the stator of the present embodiment. FIG. 4 is a view taken along the arrow A-A of FIG. 3. FIG. 1 shows coils 13 depicted with imaginary lines.

In FIGS. 1 to 4, the stator for rotating electrical machine (hereinafter called a stator) 1 according to the present embodiment includes a stator core 10 to dispose a rotor (not illustrated) inside of it to constitute a rotating electrical machine, such as a motor. The stator core 10 includes an annular yoke 11 and a plurality of teeth 12, 12 . . . that extend radially inwardly from the inner peripheral surface of the yoke 11 and are disposed at intervals in the circumferential direction θ of the yoke 11. In other words, the yoke 11 has an annular shape along the circumferential direction θ and the teeth 12, 12 . . . of the stator core 10 extend from the yoke 11 in the radial direction R.

The stator core 10 is a laminate of a plurality of foil members 10a, 10a . . . made of metal stacked along the direction Z of the rotation axis of the rotating electrical machine. Each tooth 12 has a pair of side walls 12a, 12a that face the neighboring teeth 12 in the circumferential direction θ. That is, the pair of side walls 12a, 12a defines a laminated plane where the foil members 10a, 10a . . . are laminated. The metal foil members 10a, 10a . . . of the stator core 10 are made of a soft magnetic material, and each have a thickness of 0.1 mm or less. The foil members 10a of the stator core 10 may be foil formed from a magnetic steel sheet by rolling, and each may have a thickness that is set as needed.

Each tooth 12, 12 . . . of the stator core 10 has outer walls 12b, 12b that are orthogonal to the pair of side walls 12a, 12a. Note here that the outer walls 12b, 12b are surfaces defined by the outermost foil members 10a, 10a in the direction Z of the rotation axis of the rotating electrical machine. Each tooth 12 has a distal-end face 12c that protrudes radially. The distal-end face is a flat face or a curved recess face and is opposed to a rotor not illustrated. The stator 1 includes coils 13 described later that are disposed as distributed windings in a space (slot) between the plurality of teeth 12, 12 . . . of the stator core 10.

The annular yoke 11 of the stator core 10 has mounting bosses 11a that protrude radially outwardly. The bosses 11a are formed at three positions on the perimeter, and each boss 11a has a through-hole 11b for inserting a bolt to fix the stator core 10 to a casing (not illustrated), for example.

As shown in FIG. 2, each tooth 12 of the stator core 10 has thickness T1 that is set by stacking the metal foil members 10a, 10a . . . . The tooth 12 has width W1 in the circumferential direction θ and extends toward the center (in the radial direction R) from the yoke 11 of the stator core 10 having the protruding length L1.

As shown in FIGS. 3 to 6, for example, the stator 1 includes a pair of reinforcing members 14 and 14 having an insulating property at each tooth 12. The pair of reinforcing members 14 and 14 sandwiches the corresponding tooth 12 in the direction Z of the rotation axis so as to become a bridge between the tooth 12 and a part of the yoke 11 while exposing the pair of side walls 12a and 12a of the tooth.

In other words, each tooth 12 of the stator core 10 has a pair of reinforcing members 14 disposed on the outer walls 12b in the direction Z of the rotation axis (stacking direction) so that the pair of reinforcing members 14 and 14 sandwiches the tooth 12 in the direction Z of the rotation axis. While the pair of reinforcing members 14 and 14 extends along the outer walls 12b, 12b of the tooth 12, the side walls 12a and 12a are exposed so that the stacked foil members 10a, 10a . . . are exposed.

The pair of reinforcing members 14 and 14 sandwiches the corresponding tooth 12 from both sides, and so has a function as a core to avoid the sagging of the foil members 10a, 10a . . . of the tooth 12 under the self-weight that extends in the radial direction R (toward the center) from the yoke 11 in a cantilever manner. To this end, the reinforcing members 14 are made of a material that has rigidity higher than the metal foil member 10a of the stator core 10, and may be made of synthetic resin having a thickness larger than that of the foil member 10a, for example. In some embodiments, the synthetic resin is thermosetting resin.

More specifically the reinforcing member 14 is a plate-like member made of thermosetting resin, such as epoxy resin, phenol resin, or unsaturated polyester resin, and having a thickness of 0.1 to 1 mm, for example. Such a reinforcing member 14 made of thermosetting resin does not get softened when the stator 1 is used for a rotating electrical machine and the coils 13, for example, generate heat during the application of electrical current to the coils 13 to heat the reinforcing member, and so the reinforcing member can keep the rigidity.

As shown in FIG. 3, the reinforcing member 14 has length L2 in the radial direction R that is larger than the protruding length L1 of each tooth 12, and the length L2 of the reinforcing member 14 is set so that the reinforcing member reaches the vicinity of the center of the yoke 11 of the stator core 10. In this way, each reinforcing member 14 has length L2 so as to become a bridge between the tooth 12 and a part of the yoke 11.

Each reinforcing member 14 protrudes from the side wall 12a of the corresponding tooth 12 at least at a position to place the winding 13a of the coil 13. That is, each reinforcing member 14 has width W2 that is slightly larger than width W1 of the tooth 12. Specifically W2 is set larger than W1 by about 0.2 to 0.3 mm. Note here that the protruding length of the reinforcing member 14 from the side wall 12a is smaller than the thickness of the reinforcing member 14.

Such a configuration of the reinforcing member 14 protruding from the side wall 12a of the corresponding tooth 12 at least at a position to place the winding 13a of the coil 13 allows the reinforcing member to receive a force acting on the winding 13a of the coil 13 during the formation of the coil 13 or the operation of the rotating electrical machine. This can avoid a damage of the foil members 10a of the tooth 12 due to a force from the winding 13a.

A smaller gap between the distal-end face 12c of each tooth 12, which is opposed to a rotor (not illustrated), and the rotor can increase the efficiency of the motor. Each reinforcing member 14 therefore preferably does not protrude from the distal-end face 12c of the corresponding tooth 12 and is disposed inward of the distal-end face as shown in FIG. 3.

The stator 1 of the present embodiment includes a fixing member 15 to fix the pair of reinforcing members 14 and 14 to the corresponding tooth 12. The fixing member 15 is disposed to wrap around the corresponding tooth 12 as well as the pair of reinforcing members 14 and 14. The fixing member 15 is made of a material having an insulating property, which may be an elastic material, such as rubber, or be synthetic resin having a property of contracting by heat. The fixing member 15 of the present embodiment is a tubular member such that the tooth 12 is inserted into the internal space of the fixing member 15 (see FIG. 6). Alternatively the fixing member 15 may have a ring shape as long as it can fix the reinforcing members 14 and 14 to the corresponding tooth 12.

Figure 5:
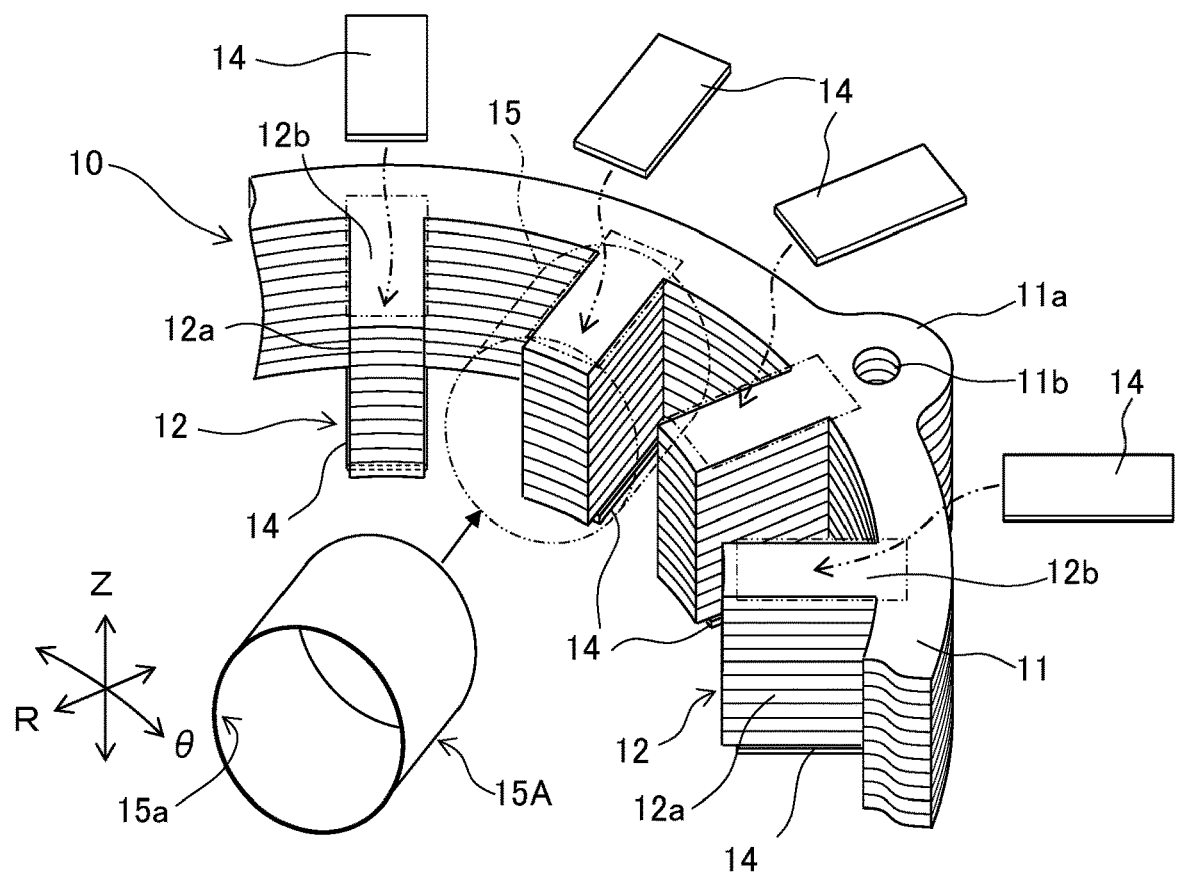
FIG. 5 is a perspective view of a major part showing the relationship among the teeth, the reinforcing members and the fixing members of the stator core.

For example when the fixing member 15 is made of synthetic resin having a heat-contraction property of contracting by heating, examples of the synthetic resin include polyvinyl chloride and polytetrafluoroethylene. In this case, as shown in FIG. 5, a tube 15A made of synthetic resin having a heat-contraction property is prepared, and each of the tooth 12 of the stator core 10 as well as the corresponding pair of reinforcing members 14 and 14 is inserted into the internal space 15a of the tube 15A, and such a tube 15A is heated to contract the tube 15A. This allows the fixing member 15 to come into intimate contact with the pair of reinforcing members 14 and 14 and the tooth 12 while wrapping around the pair of reinforcing members 14 and 14 and tooth 12.

As a result, the plurality of metal foil members 10a, 10a . . . of each tooth 12 is in intimate contact with and is integral as a laminate, and the corresponding reinforcing members 14 and 14 also is integrated with this laminate so as to sandwich the laminate. This can avoid the sagging of the tooth 12 at the distal end under the self-weight of the foil members 10a, 10a . . . . Note here that the fixing member 15 still has a heat-contraction property after it comes in intimate contact with the corresponding tooth 12 and the surfaces of the pair of reinforcing members 14 and 14. This allows the fixing member 15 to contract when the fixing member 15 is heated during the operation of the rotating electrical machine, and so can keep the fixing with the tooth 12 and the pair of reinforcing members 14 and 14.

When the fixing member 15 is an elastic material, such as rubber, examples of the elastic material include fluorine rubber and silicone rubber. Such a configuration also can avoid the sagging of the teeth 12 at the distal ends as stated above. Such a fixing member 15 also has a property of elastically deforming to follow thermal expansion or thermal contraction of the tooth 12 during the operation of the rotating electrical machine, and so can fix the pair of reinforcing members 14 and 14 to the tooth 12 more stably.

The coils 13 as stated above are wound around the plurality of teeth 12, 12 . . . that are fixed with the respective pairs of reinforcing members 14 and 14 by the fixing member 15 as distributed windings. The winding 13a of each coil 13 shown in FIG. 4 is a winding in bundles. The coil 13 in one example includes a winding 13a of rectangular wire that is wound around the corresponding teeth 12. The windings 13a of the coils 13 are arranged as distributed windings (more specifically wave windings) so that each winding is wound around the tooth 12 next to the neighboring tooth 12, for example, while skipping the neighboring tooth 12. The coils 13 of the present embodiment include three-phase coils for u-phase, v-phase and w-phase, for example.

As stated above, the stator 1 for rotating electrical machine of the present embodiment includes the stator core 10 that is the laminate of a plurality of foil members 10a made of a soft magnetic material, and the teeth 12 of the stator core 10 extend radially inwardly from the annular yoke 11. The teeth 12 therefore protrude from the yoke 11 in a cantilever manner.

The present embodiment then includes the pair of reinforcing members 14 and 14 so as to become a bridge between the corresponding tooth 12 and a part of the yoke 11 and sandwich the corresponding tooth 12 from both sides in the direction Z of the rotation axis while exposing a pair of side walls 12a and 12a of the tooth. The fixing member 15 then fixes such pair of reinforcing members 14 and 14 to the tooth 12 while wrapping around the pair of reinforcing members 14 and 14 and tooth 12. This can fix the tooth 12 to the pair of reinforcing members 14 and 14 and can avoid the sagging of the tooth 12 at the distal end under the self-weight.

The pair of reinforcing members 14 and 14 sandwiches the corresponding tooth 12 from both sides in the direction Z of the rotation axis while exposing the pair of side walls 12a and 12a of the tooth 12. This configuration therefore can keep a space between the teeth 12 (i.e., the space as a slot) to place the windings 13a. As a result, the present embodiment can keep enough space factor of the coils 13 in the form of distributed windings and can maintain the efficiency of the rotating electrical machine. The fixing member 15, which has an insulating property, does not cause conduction between the foil members 10a and 10a via the fixing member 15. This configuration therefore can keep the magnetic characteristics of the stator core 10 including the laminate of the foil members 10a, 10a.

MODIFIED EXAMPLES

Figure 7:
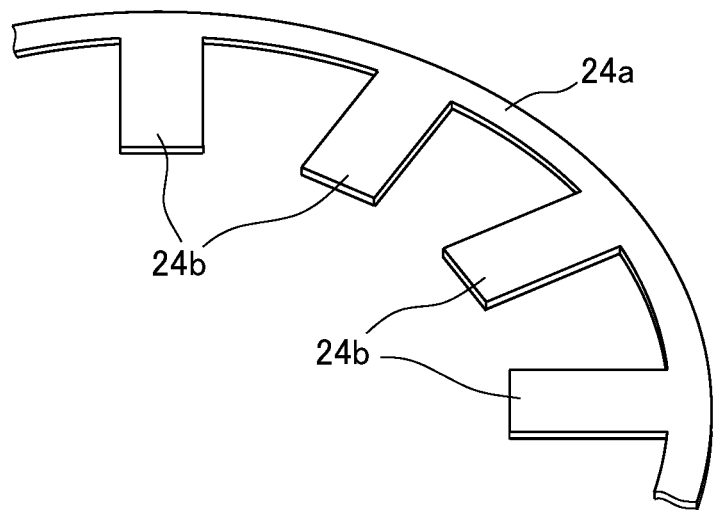
FIG. 7 is a perspective view of a major part of the reinforcing members according to a modified example of the present embodiment.
Figure 8:
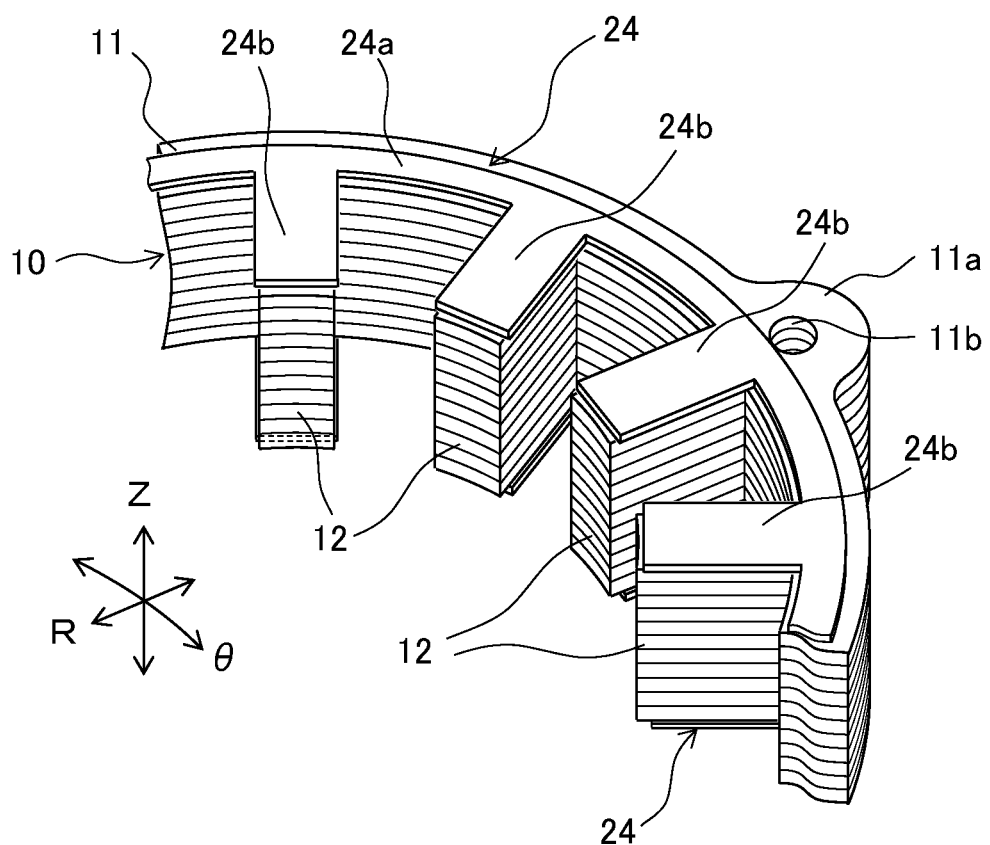
FIG. 8 is a perspective view of a major part showing the reinforcing members of FIG. 7 disposed on the stator core.

As shown in FIG. 5, the present embodiment includes a pair of reinforcing members 14 for each of the teeth 12. Alternatively, reinforcing members 24 may have a shape shown in FIGS. 7 and 8, for example. More specifically the pair of reinforcing members 24 and 24 in this modified example each include an annular part 24a having a shape along the yoke 11 and reinforcing parts 24b that extend from the annular part 24a toward the respective teeth 12. Similarly to the above embodiment, the reinforcing members 24 are made of synthetic resin having an insulating property and have a thickness larger than that of the foil member 10a.

The annular parts 24a and 24a of the pair of reinforcing members 24 and 24 are disposed to sandwich the yoke 11 from both sides in the direction Z of the rotation axis, and the reinforcing parts 24b extending from the pair of annular parts 24a are disposed to sandwich the respective teeth 12 from both sides in the direction Z of the rotation axis. The fixing member 15 then fixes the corresponding pair of reinforcing parts 24 and 24 to the corresponding tooth 12 while wrapping around these reinforcing members 24 and tooth 12.

In this modified example as well, the pair of reinforcing members 24 and 24 is disposed so as to become a bridge between the corresponding tooth 12 and a part of the yoke 11 and sandwich the tooth 12 from both sides in the direction Z of the rotation axis, which can reinforce the foil members 10a, 10a . . . of the stator core 10. Accordingly this modification example also can reliably prevent the sagging of the teeth 12 having a cantilever structure under the self-weight.

Each of the reinforcing parts 24b is integral with the annular part 24a, and so this can fix the reinforcing part 24b to the corresponding tooth 12 stably. Additionally the reinforcing parts 24b can be placed at the respective teeth 12 at one time during the manufacturing of the stator 1 for rotating electrical machine, and so the efficiency of the work increases.

Figure 6:
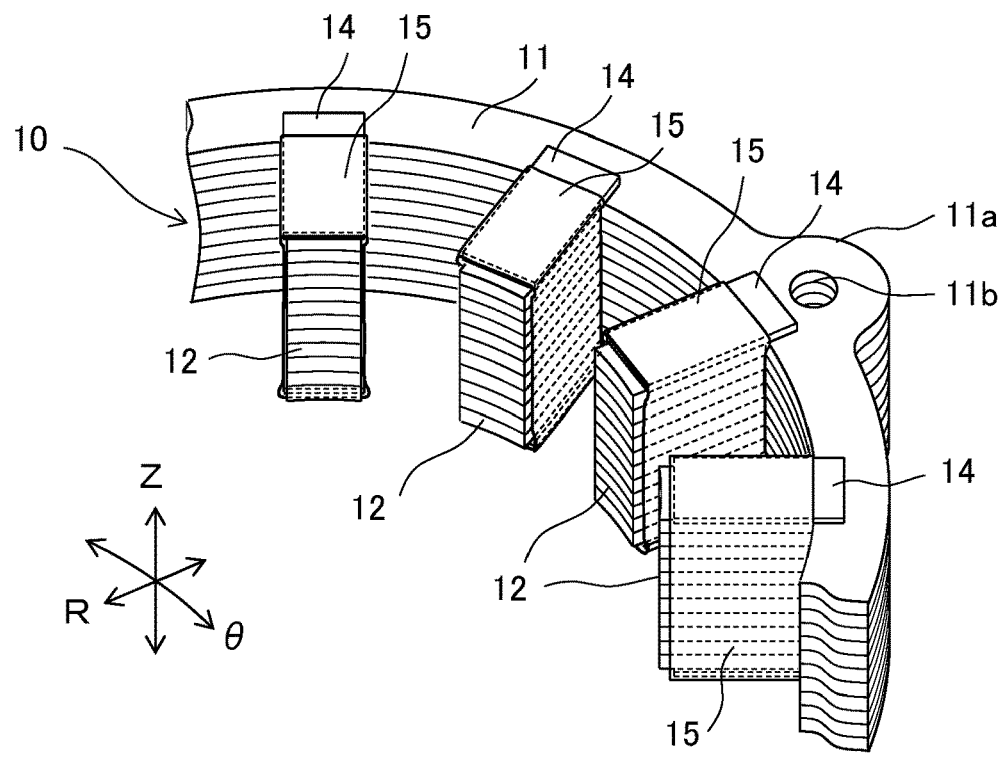
FIG. 6 is a perspective view of a major part showing the reinforcing members that sandwich the teeth of FIG. 5, which are then fixed with the fixing members.
Figure 9:
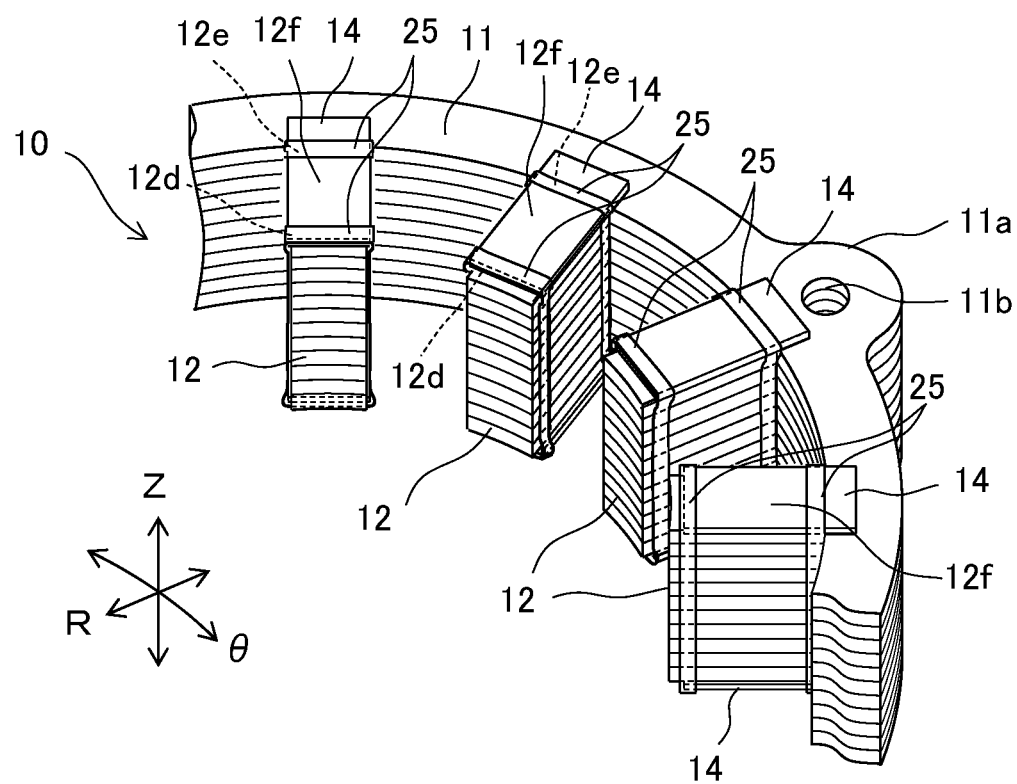
FIG. 9 is a perspective view of a major part showing the stator core according to a modified example, corresponding to FIG. 6.

The present embodiment disposes a tube-like fixing member 15 so as to cover the corresponding tooth 12 from the distal end to the root as shown in FIG. 6. Another modified example may dispose ring-like fixing members 25 as in FIG. 9. More specifically, the fixing members 25 each have a ring-like shape, and are disposed at least both of the distal end 12d and the root 12e of each of the plurality of teeth 12.

In this modified example, the windings 13a of the coils 13, which are distributed windings according to the embodiment as stated above, are preferably arranged at parts 12f where the fixing members 25 are not present. Such windings 13a of the coils 13 disposed at the parts 12f where the fixing members 25 are not present can prevent a decrease of the space factor of the coil 13 wound around the teeth 12.

EXAMPLES

The following describes examples of the present disclosure.

Example 1

A stator for rotating electrical machine shown in FIG. 1 was manufactured. More specifically 800 pieces of foil members made of a soft magnetic material (e.g., Fe-based alloy containing 80% or more of Fe manufactured by liquid quenching) and having the thickness of 0.025 mm were stacked to form a laminate, and each of the teeth of the laminate as the stator core was sandwiched between a pair of reinforcing members having the thickness of 1 mm or less and made of an insulating material (unsaturated polyester resin). Such each pair of reinforcing members was fixed to the corresponding tooth with a tube-like fixing member made of an insulating material (polyvinyl chloride) so that the fixing member wrapped around the pair of reinforcing members and tooth. Next, wires having an insulating coating were wound around this stator core as distributed windings (wave winding) to form coils. In this way, a stator for rotating electrical machine was manufactured.

Comparative Example 1

A stator for rotating electrical machine was manufactured similarly to Example 1. This comparative example was different from Example 1 in that it did not have reinforcing members and a coil was formed at a stator core including teeth having the respective fixing members wrapping therearound. The teeth of the stator core of this Comparative Example 1 sagged at the distal ends under the self-weight, and so failed to keep the shape of the stator core.

Comparative Example 2

A stator core was manufactured similarly to Example 1. This comparative example was different from Example 1 in that it did not have reinforcing members and fixing members, and the laminate was immersed in a bath of molten resin, followed by application of internal pressure to impregnate the foil members of the laminate with the resin.

<Test for Loss of Motor and the Result>

Figure 10:
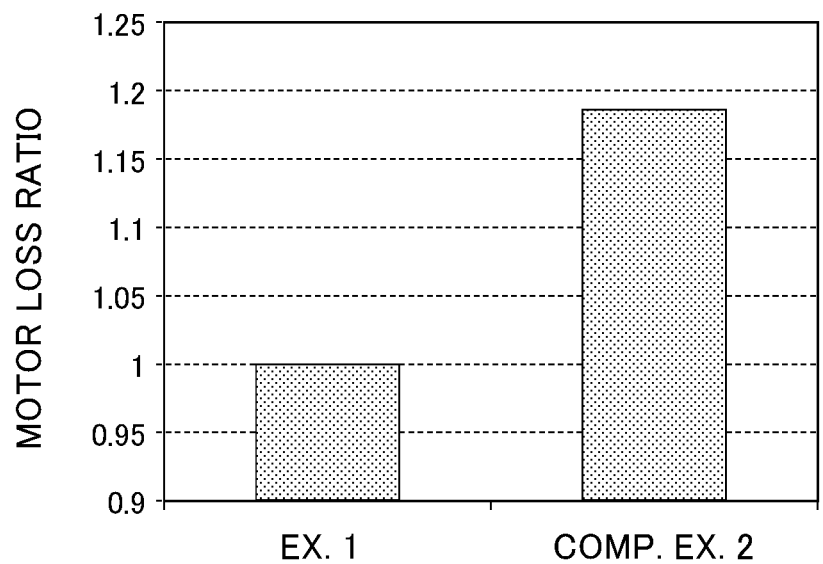
FIG. 10 is a graph showing the measurement result of the loss of motors including the test pieces of Example 1 and Comparative Example 2.

The stators of Example 1 and Comparative Example 2 were each mounted in a motor as a rotating electrical machine, and loss characteristics of the motors were measured. FIG. 10 shows the result. FIG. 10 shows the loss of the motor of Example 1 as 1 and the loss of the motor of Comparative Example 2 as the ratio of loss. As shown in FIG. 10, the motor of Example 1 had less loss than that of Comparative Example 2. Presumably stress was introduced to the material of the foil members of Comparative Example 2 due to pressure applied during the impregnation of the resin between the foil members of the laminate.

Example 2

Figure 11:
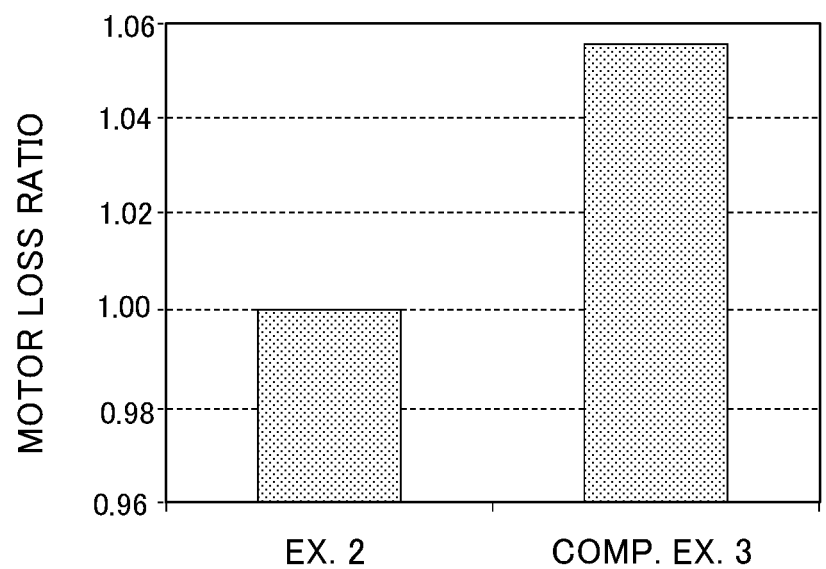
FIG. 11 is a graph showing the analysis result of the loss of motors using models of Example 2 and Comparative Example 3.

A model corresponding to the stator of Example 1 was prepared. Then the loss of the motor including such a model at the rotating speed of 9000 rpm was analyzed using analysis software (JMAG-Designer). FIG. 11 shows the result. FIG. 11 shows the loss of the motor of Example 2 as 1.

Comparative Example 3

Similarly to Example 2, the loss of the motor was analyzed. Comparative Example 3 was different from Example 1 in that reinforcing members having the same thickness as that of the reinforcing members on the outer walls were disposed on the side walls of the teeth as well. FIG. 11 shows the result.

<Analysis Result and Consideration>

As shown in FIG. 11, the motor of Example 2 had less loss than that of Comparative Example 3. This is because while the space factor of the coil between the teeth was 60% in Example 2, the space factor of the coil between the teeth of Comparative Example 3 was 54% because of the reinforcing members on the side walls of the teeth, so that the space factor of the coil of Comparative Example 3 was lower than that of Example 2. Presumably Comparative Example 3 required more current to be applied to the coil for the same output from a motor than in Example 2, and the loss of the motor increased in Comparative Example 3.

That is a detailed description of the embodiments of the present disclosure. The present disclosure is not limited to the above-stated embodiment, and the design may be modified variously without departing from the spirits of the present disclosure.

For example, the reinforcing member of the present embodiment protrudes from the side wall of the corresponding tooth at a position to place the winding of the coil. In another example, the end of each reinforcing member may coincide with the side wall of the corresponding tooth.

DESCRIPTION OF SYMBOLS

1 Stator
10 Stator core
11 Yoke
10a Metal foil member (foil member)
12 A plurality of teeth
12a Side wall
12b Outer wall
13 Coil
14 Reinforcing member
15 Fixing member

What is claimed is:

1. A stator for rotating electrical machine comprising a stator core including an annular yoke and a plurality of teeth that extend radially inwardly from an inner peripheral surface of the yoke and are disposed at intervals in a circumferential direction of the yoke, wherein
the stator core is a laminate of a plurality of foil members made of a soft magnetic material that are stacked in a direction of a rotation axis of the rotating electrical machine,
each tooth has a pair of side walls that face neighboring teeth in the circumferential direction,
the stator includes:
a plurality of pairs of reinforcing members having an insulating property, each pair of the reinforcing members becoming a bridge between a corresponding tooth and a part of the yoke and sandwiching the corresponding tooth from both sides in the direction of the rotation axis while exposing the pair of side walls;
a plurality of fixing members having an insulating property, each of the fixing members fixing the corresponding pair of reinforcing members to the corresponding tooth while wrapping around the pair of reinforcing members and tooth; and
coils formed as distributed windings at the plurality of teeth that is fixed with the fixing members.

2. The stator for rotating electrical machine according to claim 1, wherein each fixing member has a ring-shape or a tubular-shape having an internal space, into which the corresponding tooth is inserted.

3. The stator for rotating electrical machine according to claim 1, wherein the stator includes, as the reinforcing members, an annular part having a shape along the yoke and a plurality of reinforcing parts each extending from the annular part toward the corresponding tooth.

4. The stator for rotating electrical machine according to claim 1, wherein each of the reinforcing members protrudes from the side wall of the corresponding tooth at least at a position to place the windings of the coils.

5. The stator for rotating electrical machine according to claim 1, wherein the fixing members each have a ring shape and are disposed at least at one of distal ends and roots of the plurality of teeth, and the winding of each coil is disposed at a part where the fixing members are not present.

6. The stator for rotating electrical machine according to claim 1, wherein each of the reinforcing members is made of a material that has rigidity higher than the plurality of foil members of the stator core.

7. The stator for rotating electrical machine according to claim 1, wherein each of the reinforcing members has a length in a radial direction that is larger than a protruding length of each tooth in the radial direction.

8. The stator for rotating electrical machine according to claim 7, wherein the length of each of reinforcing members is set so that each of the reinforcing members reaches a center of the yoke.

9. The stator for rotating electrical machine according to claim 1, wherein a first radial end and a second radial end opposite the first radial end of each of the reinforcing members protrudes in the circumferential direction from the pair of side walls of the corresponding tooth.

10. The stator for rotating electrical machine according to claim 1, wherein each of the reinforcing members protrudes from the pair of side walls of the corresponding tooth at least at a position to place a winding of the coils.

* * * * *